(12) United States Patent
Yim (10) Patent No.: US 9,405,016 B2
(45) Date of Patent: Aug. 2, 2016

(54) SYSTEM AND METHOD FOR COMPLEX NAVIGATION USING DEAD RECKONING AND GPS

(71) Applicant: HYUNDAI MOBIS CO., LTD., Seoul (KR)

(72) Inventor: Hyun Gu Yim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/532,541

(22) Filed: Nov. 4, 2014

(65) Prior Publication Data

US 2016/0097862 A1  Apr. 7, 2016

(30) Foreign Application Priority Data

Oct. 6, 2014 (KR) ........................ 10-2014-0134323

(51) Int. Cl.
*G01S 19/49* (2010.01)
*G01C 21/16* (2006.01)

(52) U.S. Cl.
CPC .............. *G01S 19/49* (2013.01); *G01C 21/165* (2013.01)

(58) Field of Classification Search
USPC ......... 701/468, 469, 445, 446, 447, 448, 470, 701/471, 479, 480; 342/357.31, 357.22, 342/357.23, 357.24
See application file for complete search history.

(56) References Cited

U.S. PATENT DOCUMENTS

| | | | | |
|---|---|---|---|---|
| 5,394,333 A * | 2/1995 | Kao | ...................... | G01C 21/30 340/990 |
| 5,590,043 A * | 12/1996 | McBurney | .............. | G01S 19/29 342/357.23 |
| 5,923,270 A * | 7/1999 | Sampo | ................. | A01B 69/008 180/6.7 |
| 5,995,023 A * | 11/1999 | Kreft | ....................... | G01S 19/49 340/988 |
| 6,091,359 A * | 7/2000 | Geier | ..................... | G01C 21/20 342/357.31 |
| 6,915,205 B2 | 7/2005 | Kim et al. | | |
| 7,124,026 B2 * | 10/2006 | Hong | .................. | G01C 21/165 342/357.22 |
| 2002/0019697 A1 * | 2/2002 | Cong | ..................... | G01S 13/723 701/301 |
| 2005/0149240 A1 * | 7/2005 | Tseng | ................. | B60G 17/016 701/38 |
| 2009/0088974 A1 * | 4/2009 | Yasan | ..................... | G01S 19/48 701/469 |
| 2010/0204887 A1 * | 8/2010 | Ichinose | ............. | B60L 15/2036 701/41 |
| 2011/0148697 A1 * | 6/2011 | Thiel | ...................... | G01S 19/24 342/357.26 |
| 2011/0208424 A1 * | 8/2011 | Hirsch | .................... | G01S 19/47 701/532 |
| 2011/0257882 A1 * | 10/2011 | McBurney | ............. | G01C 21/30 701/532 |
| 2014/0095067 A1 * | 4/2014 | Iida | ......................... | G01S 19/40 701/472 |
| 2014/0195151 A1 * | 7/2014 | Sun | ...................... | G01C 21/165 701/472 |

FOREIGN PATENT DOCUMENTS

| | | |
|---|---|---|
| JP | 2007-533878 A | 11/2007 |
| KR | 10-2007-0021872 A | 2/2007 |
| KR | 10-2013-0021985 A | 3/2013 |
| KR | 10-2014-0006166 A | 1/2014 |

\* cited by examiner

*Primary Examiner* — Thomas Tarcza
*Assistant Examiner* — Richard Goldman
(74) *Attorney, Agent, or Firm* — NSIP Law (57) ABSTRACT

Provided are a system and method for complex navigation using dead reckoning and a global positioning system capable of enhancing robustness of positioning by compensating for discontinuity of GPS reception data. The system for complex navigation using dead reckoning (DR) and a global positioning system (GPS) includes a GPS receiving unit configured to receive GPS data, a DR unit configured to generate DR information by using a wheel speed, a steering angle, and a yaw rate, a buffer unit configured to store the DR information, and a filter unit configured to generate positioning information of a moving object by using at least one of output information from the GPS receiving unit and the DR information stored in the buffer unit.

19 Claims, 4 Drawing Sheets

SYSTEM AND METHOD FOR COMPLEX NAVIGATION USING DEAD RECKONING AND GPS

CROSS-REFERENCE TO RELATED APPLICATIONS

This application claims priority under 35 U.S.C. §119 to Korean Patent Application No. 10-2014-0134323, filed on Oct. 6, 2014, the disclosure of which is incorporated herein by reference in its entirety.

TECHNICAL FIELD

The present invention relates to a system and method for complex navigation using dead reckoning and a global positioning system (GPS), and more particularly, to a system and method for complex navigation using dead reckoning and a global positioning system capable of enhancing robustness of positioning by compensating for discontinuity of GPS reception data.

BACKGROUND

With the development of low-grade, small, low-power consuming, low-priced global positioning system (GPS) receivers, GPS receivers have mainly been used as positioning sensors in a commercial vehicle navigation system, and a location-based service (LBS) provides navigation information such as a location, a speed, and the like, and road guidance, notification of a dangerous area, and the like, for users by matching location information of a vehicle obtained through a GPS receiver to a digital map.

However, when a GPS signal is completely or partially blocked in a tunnel, an underground parking lot, a downtown area, and the like, a GPS receiver cannot provide accurate location information.

Thus, in order to provide positioning information without discontinuation, a dead reckoning (DR) system including a speedometer, a geomagnetic sensor, an inertial sensor, and the like, may be coupled to a GPS receiver to configure a DR/GPS complex navigation system.

Such a DR/GPS complex navigation system may be variously configured depending on the forms of DR, coupling schemes, and coupled filters.

Here, A Kalman filter has mostly been used as a coupled filter, and an extended Kalman filter (EKF) is used in order to apply a Kalman filter employed in a linear system to a DR/GPS complex navigation system as a nonlinear system.

GPS reception data is time-delayed data, relative to other sensor data input at the same time, and thus, if GPS reception data and DR data are joined without considering such characteristics of GPS reception data, performance of estimating a location may inevitably be degraded.

SUMMARY

Accordingly, the present invention provides a system and method for complex navigation using dead reckoning and a global positioning system capable of enhancing robustness of positioning by compensating for discontinuity of GPS reception data.

The object of the present invention is not limited to the aforesaid, but other objects not described herein will be clearly understood by those skilled in the art from descriptions below.

In one general aspect, a system for complex navigation using dead reckoning (DR) and a global positioning system (GPS) includes: a GPS receiving unit configured to receive GPS data; a DR unit configured to generate DR information by using a wheel speed, a steering angle, and a yaw rate; a buffer unit configured to store the DR information; and a filter unit configured to generate positioning information of a moving object by using at least one of output information from the GPS receiving unit and the DR information stored in the buffer unit.

The DR unit may include: a movement distance calculating unit configured to calculate a movement distance of the moving object by using the wheel speed; a curvature calculating unit configured to calculate a running curvature of the moving object by using the yaw rate and the steering angle; and an estimating unit configured to estimate positioning information of the moving object by using the calculated movement distance and the calculated running curvature.

The DR unit may further include: a bias correcting unit configured to correct an offset bias of the yaw rate.

The buffer unit may store a preset number of pieces of DR information which have been generated at a point in time earlier than the current point in time.

When the output information from the GPS receiving unit is input at a period of the system for complex navigation, the filter unit may select DR information synchronized with the output information from the GPS receiving unit, from the buffer unit in consideration of a time delay between the GPS receiving unit and the DR unit, and generate positioning information of the moving object by using the output information from the GPS receiving unit and the selected DR information.

When the output information from the GPS receiving unit is not input at the period of the system for complex navigation, the filter unit may generate positioning information of the moving object by using only the DR information.

The filter unit may update the DR information stored in the buffer unit based on the positioning information of the moving object generated by using the output information from the GPS receiving unit and the selected DR information.

The system may further include: a fusion determining unit configured to compare a difference between the output information from the GPS receiving unit and the selected DR information with an expected error, and determine whether to fuse the output information from the GPS receiving unit and the selected DR information.

When the difference exceeds the expected error, the fusion determining unit may determine to generate positioning information of the moving object by using only the selected DR information.

In another general aspect, a system for complex navigation using dead reckoning (DR) and a global positioning system (GPS) includes: a GPS receiving unit configured to receive GPS data and provide a position of a visible satellite and pseudo-range information at every first period; a DR unit configured to generate DR information at every second period by using a wheel speed, a steering angle, and a yaw rate; a buffer unit configured to store a preset number of pieces of DR information which have been generated at a point in time earlier than the current point in time; and a filter unit configured to generate positioning information of a moving object at every third period by using at least one of output information from the GPS receiving unit and the DR information stored in the buffer unit, wherein when output information from the GPS receiving unit is input at a point in time corresponding to the third period, the filter unit selects DR information synchronized with the output information from the GPS receiving unit, from the buffer in consideration of a time delay between the GPS receiving unit and the DR unit, and generates positioning information of the moving object by using the output information from the GPS receiving unit and the selected DR information.

The system may further include: a fusion determining unit configured to compare a difference between the output information from the GPS receiving unit and the selected DR information with an expected error, and determine to generate positioning information of the moving object by using only the selected DR information when the difference exceeds the expected error.

In another general aspect, a location estimating method of a system for complex navigation using dead reckoning (DR) and a global positioning system (GPS) includes: processing received GPS data to generate first location information of a moving object; generating second location information of the moving object by using a wheel speed, a steering angle, and a yaw rate; storing the second location information; and generating positioning information of the moving object by using at least one of the first location information and the stored second location information.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 1:
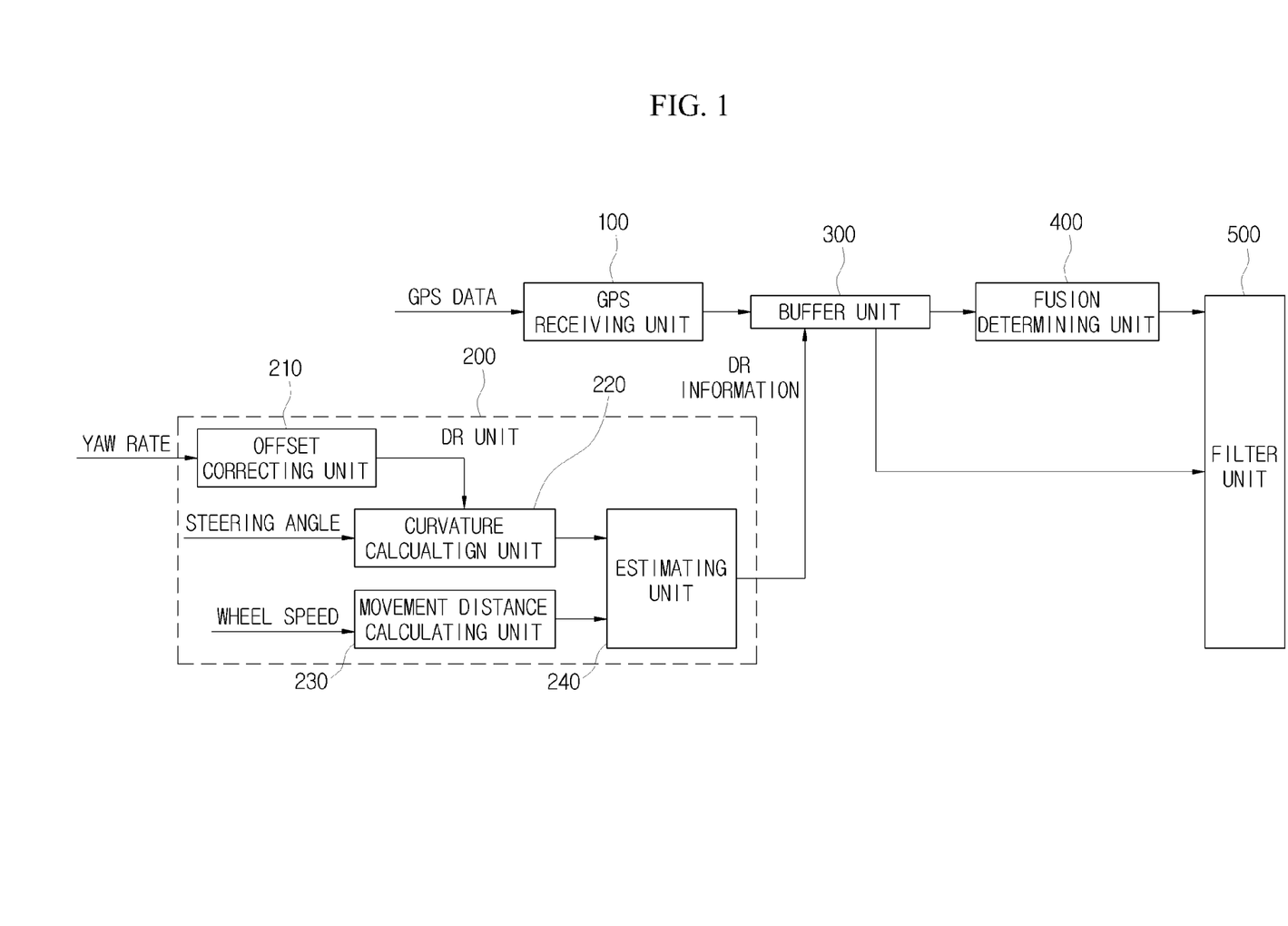
FIG. 1 is block diagram illustrating a system for complex navigation using dead reckoning (DR) and a global positioning system (GPS) according to an embodiment of the present invention.

FIG. 1 is block diagram illustrating a system for complex navigation using dead reckoning (DR) and a global positioning system (GPS) according to an embodiment of the present invention.

Referring to FIG. 1, a system for complex navigation using dead reckoning (DR) and a global positioning system (GPS) according to an embodiment of the present invention includes a GPS receiving unit 100, a DR unit 200, a buffer unit 300, a fusion determining unit 400, and a filter unit 500.

The GPS receiving unit 100 receives information such as positioning data (latitude, longitude, heading, etc.) of a moving object, error information (dilution of precision (DOP), Stdev, etc.), mode information, the number of satellites, and the like, from GPS satellites, processes the received information, and outputs first location information of the moving object.

The DR unit 200 estimates second location information of the moving object by using a wheel speed measured by a sensor (e.g., a speedometer, an odometer, an accelerometer, etc.) for measuring a running distance of the moving object, a yaw rate measured by a sensor (e.g., a geomagnetic sensor, a gyro sensor, etc.) for measuring a rotation angle of the moving object, and a steering angle.

The DR unit 200 includes an offset correcting unit 210, a curvature calculating unit 220, a movement distance calculating unit 230, and an estimating unit 240 and generates second location information, namely, DR information, regarding the moving object.

The offset correcting unit 210 corrects an offset bias of the measured yaw speed. The sensor measuring a yaw speed involves an offset bias, and fundamentally, a yaw speed has a value 0 when a moving object is stationary or moves rectilinearly. Thus, the offset correcting unit 210 measures an offset bias at an initial point in time (when the speed is 0) and subtracts the measured offset bias from a yaw speed measurement value to thus correct the offset bias of the yaw speed.

The curvature calculating unit 220 estimates a running curvature of the moving object by using the corrected yaw speed and the steering angle. When a curvature is estimated by using a yaw speed, estimation noise exists, and in particular, significant estimation noise appears at a low speed. Estimation of a curvature using a steering angle has high continuity but involves an estimation bias. The yaw speed and the steering angle are complementary, and thus, when a curvature is estimated by fusing the yaw speed and the steering angle, a precise running curvature can be obtained. Here, a Kalman filter is used.

The movement distance calculating unit 230 calculates a movement speed of the moving object by using the measured wheel speed and a wheel size.

The estimating unit 240 estimates positioning (e.g., a latitude, a longitude, heading) of the moving object through DR using the movement distance ds calculated by using the wheel speed and the estimated curvature k. k*ds corresponds to a variation of heading, and latitude and longitude information are updated using the variation. Also, covariance of each element is also calculated.

The buffer unit 300 stores second location information of the moving object estimated by the DR unit 200.

The second location information estimated through the sequential processes is fused with the first location information output from the GPS receiving unit 100 in the filter unit 500 (to be described hereinafter) to generate positioning information of the moving object.

In general, in order for the GPS receiving unit 100 to process the received GPS data and output the first location information, a time required for processing data is required. For this reason, even though the first location information and the second location information are generated at the same time, there is a time delay between the two pieces of information. Specifically, the first location information may be delayed by 60 ms, compared with the first location information. Namely, if the first location information is generated at t=0, it has a synchronized with the second location information generated at −60 ms.

Thus, in order to fuse the first location information generated by the GPS receiving unit 100 and the second location information in synchronization, the second location information need to be stored for a predetermined period of time or a predetermined number of pieces of second location information need to be stored. The system for complex navigation using DR and a GPS according to an embodiment of the present invention provide a scheme in which the buffer unit 300 stores the second location information for a predetermined period of time or storing a predetermined number of pieces of second location information to thereby enable the filter unit 500 (to be described hereinafter) to fuse the synchronized first and second location information.

Meanwhile, even though the GPS receiving unit 100 receives GPS data, positioning may be inaccurate due to defective reception or for other reasons. In this case, preferably, the GPS receiving unit 100 generates positioning information of the moving object by using only the second location information estimated by the DR unit 200, excluding the first location information output from the GPS receiving unit 100.

When the positioning is inaccurate, the fusion determining unit 400 may determine to generate positioning information of the moving object by using only the second location information, rather than fusing the first and second location information. Namely, the fusion determining unit 400 determines whether to fuse the first and second location information.

The fusion determining unit 400 determines whether a difference between the first location information and the second location information exceeds a pre-set expected error. When the difference exceeds the expected error, the fusion determining unit 400 determines that positioning is inaccurate, and determines to generate positioning information of the moving object with only the second location information, rather than fusing the two pieces of information. Equation 1 below is used to determine whether to fuse the two pieces of information by the fusion determining unit 400. Here, DRx denotes the second location information, GPSx denotes the first location information, P_DRx denotes an expected error variance of the second location information, P_GPSx denotes an expected error variance of the first location information, and ϵ denotes an expected error.

$$\frac{(Drx \mid GPSx)^2}{P_{DRx} + P_{GPSx}} < \varepsilon^2 \quad (1)$$

It should be appreciated that the second location information compared with the first location information is location information synchronized with the first location information among a plurality of pieces of location information stored in the buffer unit 300.

The filter unit 500 generates positioning information of the moving object by using at least one among the first location information output from the GPS receiving unit 100 and the second location information stored in the buffer unit 300. Here, a Kalman filter may be used.

For example, it is assumed that a period of the system for complex navigation using DR and a GPS according to an embodiment of the present invention is 20 ms, a period of the GPS receiving unit 100 is 100 ms, a period of the DR unit 200 is 10 ms. Accordingly, the first location information is output from the GPS receiving unit 100 at the period of 100 ms, the second location information is output from the DR unit 200 at the period of 10 ms, and the filter unit 500 fuses the first and second location information in units of 20 ms.

When the filter unit 500 intends to fuse the first location information and the second location information, the first location information output from the GPS receiving unit 100 may not be present according to circumstances. In this case, the filter unit 500 generates positioning information of the moving object by using only the second location information.

Meanwhile, when the filter unit 500 intends to fuse the first location information and the second location information, if the first location information output from the GPS receiving unit 100 is present and the fusion determining unit 400 determines to fuse the two pieces of location information, the filter unit 500 generates positioning information of the moving object by using both the first location information and the second location information. Here, obviously, the second location information has been synchronized with the first location information.

Figure 2:
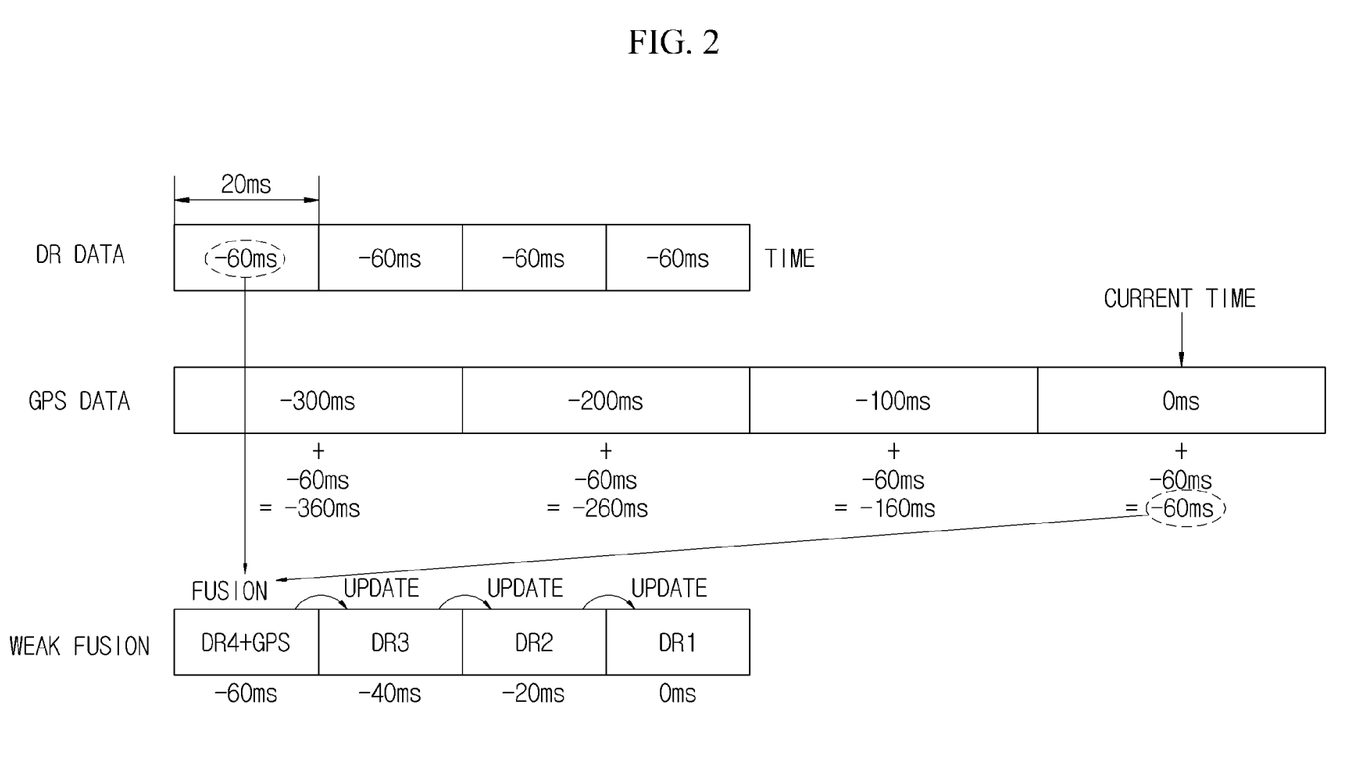
FIG. 2 is a view illustrating a method for fusing output information from a GPS receiving unit and DR information by a filter unit illustrated in FIG. 1.

FIG. 2 is a view illustrating a method for the first location information and the second location information by the filter unit 500.

Referring to FIG. 2, it is illustrated that four pieces (−60 ms, −40 ms, −20 ms, 0 ms (current time)) of DR information, namely, the second location information, are stored in the buffer unit 300 at the period of 20 ms.

When it is assumed that four pieces of first location information 300 ms, −200 ms, −100 ms, 0 ms (current time)) is output from the GPS receiving unit 100 at the period of 100 ms and there is a time delay of 60 ms between the first location information and the second location information, the first location information output at the current time (0 ms) is information which was actually output at −60 ms, and similarly, the first information output at −300 ms is information which was actually output at −360 ms.

Thus, the second location information synchronized with the first location information output at the current time (0 ms) corresponds to information DR4 which was output at the time of −60 ms, and the filter unit 300 selects location DR4 synchronized with the first location information from among the plurality of pieces of second location information stored in the buffer unit 300, and fuses the two pieces of information (DR4+GPS). In this manner, in the system for complex navigation using DR and a GPS according to an embodiment of the present invention, by fusing the GPS data and the DR information in consideration of a time delay, positioning performance of the moving object can be enhanced.

Hereinafter, a location estimating method of the system for complex navigation using DR and a GPS according to an embodiment of the present invention will be described with reference to FIGS. 1 through 3.

Figure 3A:
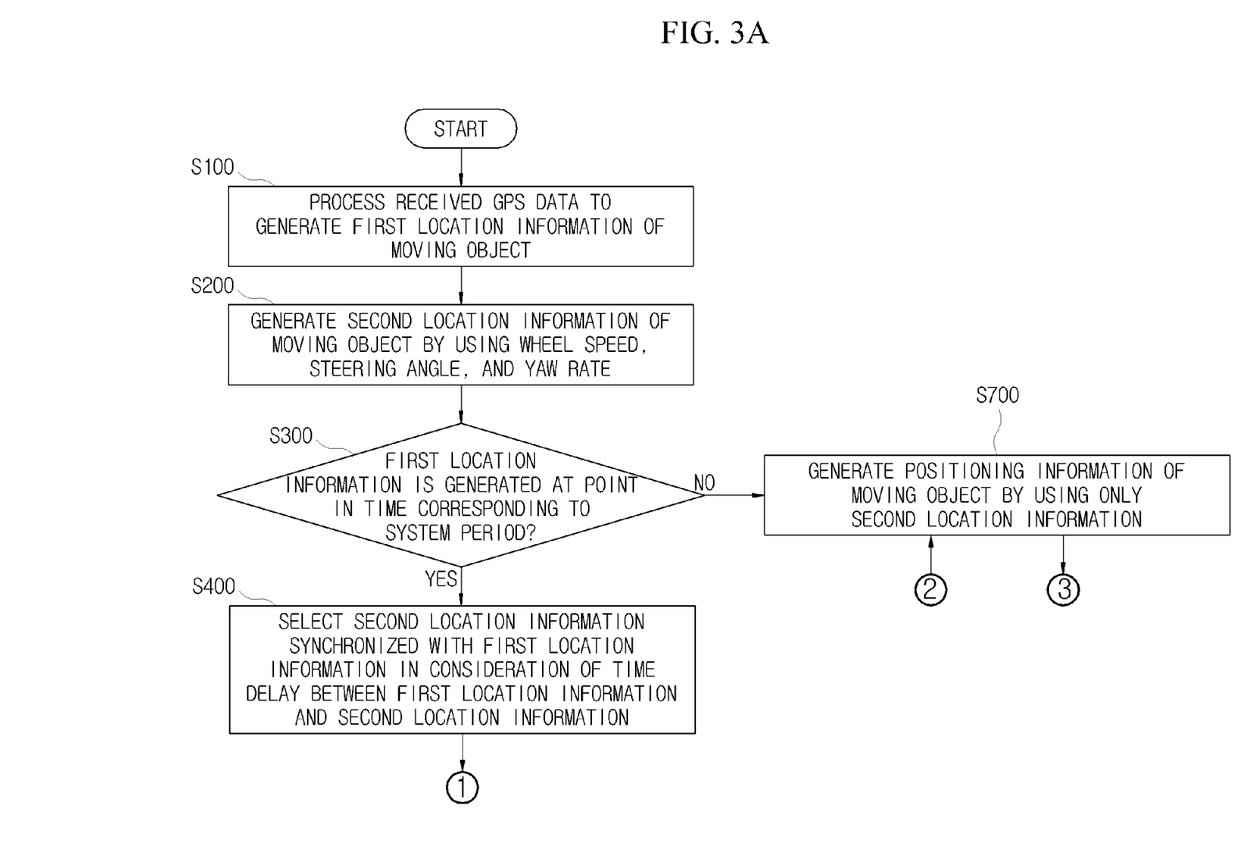
FIG. 3A and FIG. 3B are a flow chart illustrating a location estimating method of a system for complex navigation using DR and a GPS according to an embodiment of the present invention.
Figure 3B:
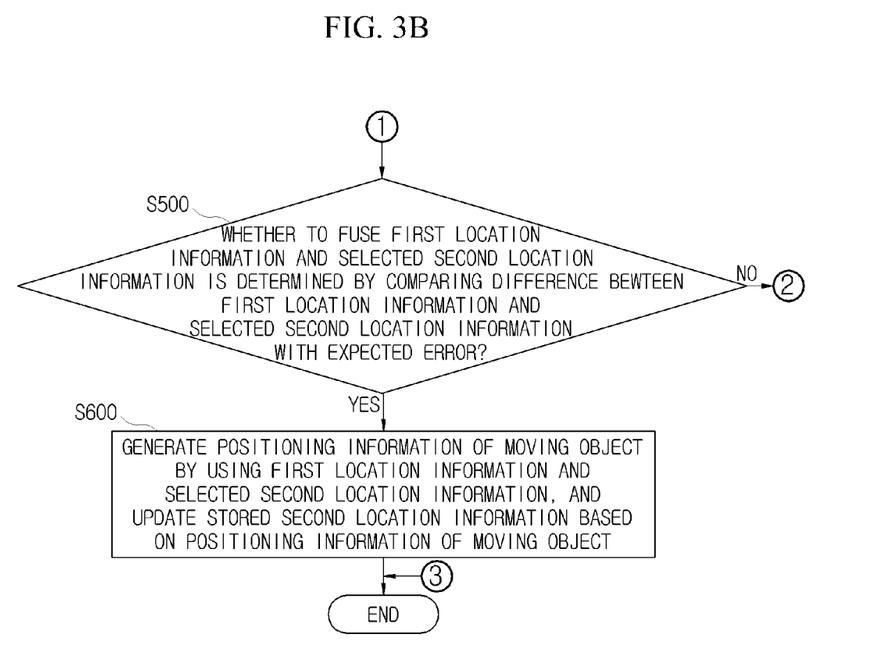

FIG. 3A and FIG. 3B are a flow chart illustrating a location estimating method of a system for complex navigation using DR and a GPS according to an embodiment of the present invention.

First, the GPS receiving unit 100 receives information such as positioning data (a latitude, a longitude, heading, etc.) of the moving object, error information (DOP, Stdev, etc.), mode information, the number of satellites, and the like, from GPS satellites, processes the received information, and outputs first location information of the moving object in step S100.

The DR unit 200 estimates second location information of the moving object by using a wheel speed measured by a sensor (e.g., a speedometer, an odometer, an accelerometer, etc.) for measuring a running distance of the moving object, a yaw rate measured by a sensor (e.g., a geomagnetic sensor, a gyro sensor, etc.) for measuring a rotation angle of the moving object, and a steering angle in step S200.

When the filter unit 500 intends to fuse the first and second location information, the filter unit 500 determines whether there is first location information output from the GPS receiving unit 100 in step S300.

When the filter unit 500 intends to fuse the first location information and the second location information, the first location information output from the GPS receiving unit 100 may not be present according to circumstances. In this case, the filter unit 500 generates positioning information of the moving object by using only the second location information in step S700.

Meanwhile, when the filter unit 500 intends to fuse the first location information and the second location information, if the first location information output from the GPS receiving unit 100 is present, the filter unit 500 selects second location information synchronized with the first location information from among a plurality of pieces of second location information stored in the buffer unit 300 in step S400.

The process of selecting the second location information synchronized with the first location information has been described above with reference to FIG. 3, so a detailed description thereof will be omitted.

Next, the fusion determining unit 400 determines whether a difference between the first location information and the second location information exceeds a pre-set expected error in step S500.

When the difference exceeds the expected error, the fusion determining unit 400 determines that positioning is inaccurate, and determines to generate positioning information of the moving object with only the second location information, rather than fusing the two pieces of information. In this case, the filter unit 500 generates positioning information of the moving object by using only the second location information in step S700.

Meanwhile, when the fusion determining unit 400 determines to fuse the two pieces of location information, the filter unit 500 generates positioning information of the moving object by using both the first location information and the second location information in step S600. Here, obviously, the second location information has been synchronized with the first location information.

According to the embodiments of the present invention as described above, robustness of positioning can be guaranteed by compensating for discontinuity of GPS reception data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for complex navigation using dead reckoning (DR) and a global positioning system (GPS), the system comprising:
   a GPS receiving unit configured to receive GPS data;
   a DR unit configured to generate DR information by using a wheel speed, a steering angle, and a yaw rate;
   a buffer unit configured to store the DR information;
   a filter unit configured to generate positioning information of a moving object by using at least one of output information from the GPS receiving unit and the DR information stored in the buffer unit; and
   a fusion determining unit configured to
      determine whether to fuse first location information of the moving object and second location information of the moving object,
      determine whether a difference between the first location information and the second location information exceeds a preset expected error, and
      determine, in response to the difference exceeding the expected error, that positioning is inaccurate and to generate positioning information of the moving object with only the second location information,
   wherein the filter unit is further configured to generate, in response to the fusion determining unit generating positioning information using both the first location information and the second location information, positioning information of the moving object using both the first location information and the second location information.

2. The system of claim 1, wherein the fusion determining unit is further configured to determine whether to fuse the first location information and second location information using the following equation:

$$\frac{(Drx \mid GPSx)^2}{P_{DRx} + P_{GPSx}} < \varepsilon^2$$

wherein Drx denotes the second location information, GPSx denotes the first location information, $P_{DRx}$ denotes an expected error variance of the second location information, $P_{GPSx}$ denotes an expected error variance of the first location information, and $\varepsilon$ denotes an expected error.

3. The system of claim 1, wherein the DR unit comprises:
   a movement distance calculating unit configured to calculate a movement distance of the moving object by using the wheel speed;
   a curvature calculating unit configured to calculate a running curvature of the moving object by using the yaw rate and the steering angle; and
   an estimating unit configured to estimate positioning information of the moving object by using the calculated movement distance and the calculated running curvature.

4. The system of claim 3, wherein the DR unit further comprises:
   a bias correcting unit configured to correct an offset bias of the yaw rate.

5. The system of claim 1, wherein the buffer unit is configured to store a preset number of pieces of DR information which have been generated at a point in time earlier than the current point in time.

6. The system of claim 1, wherein in response to the output information from the GPS receiving unit being input at a period of the system for complex navigation, the filter unit selects DR information synchronized with the output information from the GPS receiving unit, from the buffer unit in consideration of a time delay between the GPS receiving unit and the DR unit, and generates positioning information of the moving object by using the output information from the GPS receiving unit and the selected DR information.

7. The system of claim 1, wherein in response to the output information from the GPS receiving unit not being input at the period of the system for complex navigation, the filter unit generates positioning information of the moving object by using only the DR information.

8. The system of claim 6, wherein the filter unit is configured to update the DR information stored in the buffer unit based on the positioning information of the moving object generated by using the output information from the GPS receiving unit and the selected DR information.

9. The system of claim 6, further comprising:
a fusion determining unit configured to compare a difference between the output information from the GPS receiving unit and the selected DR information with an expected error, and determine whether to fuse the output information from the GPS receiving unit and the selected DR information.

10. The system of claim 9, wherein in response to the difference exceeding the expected error, the fusion determining unit determines to generate positioning information of the moving object by using only the selected DR information.

11. A system for complex navigation using dead reckoning (DR) and a global positioning system (GPS), the system comprising:
a GPS receiving unit configured to receive GPS data and provide a position of a visible satellite and pseudo-range information at every first period;
a DR unit configured to generate DR information at every second period by using a wheel speed, a steering angle, and a yaw rate;
a buffer unit configured to store a preset number of pieces of DR information which have been generated at a point in time earlier than the current point in time;
a filter unit configured to generate positioning information of a moving object at every third period by using at least one of output information from the GPS receiving unit and the DR information stored in the buffer unit; and
a fusion determining unit configured to
determine whether to fuse first location information of the moving object and second location information of the moving object,
determine whether a difference between the first location information and the second location information of the moving object exceeds a preset expected error, and
determine, in response to the difference exceeding the expected error, that positioning is inaccurate and to generate positioning information of the moving object with only the second location information,
wherein the filter unit is further configured to generate, in response to the fusion determining unit generating positioning information using both the first location information and the second location information, positioning information of the moving object using both the first location information and the second location information, and
wherein, in response to output information from the GPS receiving unit being input at a point in time corresponding to the third period, the filter unit selects DR information synchronized with the output information from the GPS receiving unit, from the buffer in consideration of a time delay between the GPS receiving unit and the DR unit, and generates positioning information of the moving object by using the output information from the GPS receiving unit and the selected DR information.

12. The system of claim 11, further comprising:
a fusion determining unit configured to compare a difference between the output information from the GPS receiving unit and the selected DR information with an expected error, and determine to generate positioning information of the moving object by using only the selected DR information in response to the difference exceeding the expected error.

13. A location estimating method of a system for complex navigation using dead reckoning (DR) and a global positioning system (GPS), the location estimating method comprising:
processing received GPS data to generate first location information of a moving object;
generating second location information of the moving object by using a wheel speed, a steering angle, and a yaw rate;
storing the second location information;
generating positioning information of the moving object by using at least one of the first location information and the stored second location information;
determining whether to fuse first location information of the moving object and second location information of the moving;
determining whether a difference between the first location information and the second location information exceeds a preset expected error;
determining, in response to the difference exceeding the expected error, that positioning is inaccurate and to generate positioning information of the moving object with only the second location information; and
generating, in response to the fusion determining unit generating positioning information using both the first location information and the second location information, positioning information of the moving object using both the first location information and the second location information.

14. The location estimating method of claim 13, wherein the generating of second location information comprises:
calculating a movement distance of the moving object by using the wheel speed;
calculating a running curvature of the moving object by using the yaw rate and the steering angle; and
estimating positioning information of the moving object by using the calculated movement distance and the calculated running curvature.

15. The location estimating method of claim 13, wherein the generating of positioning information of the moving object comprises:
in response to the first location information being generated at a period of the system for complex navigation, selecting second location information synchronized with the first location information in consideration of a time delay between the first location information and the second location information; and
generating positioning information of the moving object by using the first location information and the selected second location information.

16. The location estimating method of claim 13, wherein the generating of positioning information of the moving object comprises:

in response to the first location information not being generated at the period of the system for complex navigation, generating positioning information of the moving object by using only the second location information.

17. The location estimating method of claim 15, wherein the generating of positioning information of the moving object comprises:

updating the stored second location information based on the positioning information of the moving object generated by using the first location information and the selected second location information.

18. The location estimating method of claim 15, wherein the generating of positioning information of the moving object comprises:

comparing a difference between the first location information and the selected second location information with an expected error to determine whether to fuse the first location information and the selected second location information.

19. The location estimating method of claim 18, wherein in response to the difference exceeds the expected error, determining to generate positioning information of the moving object by using only the selected second location information.

\* \* \* \* \*